United States Patent [19]
Lawson

[11] Patent Number: 5,177,943
[45] Date of Patent: Jan. 12, 1993

[54] MOWING DEVICE
[75] Inventor: Francis J. Lawson, Lefaivre, Canada
[73] Assignee: Cummings Associates, Sharon, Mass.
[21] Appl. No.: 781,442
[22] Filed: Oct. 23, 1991

Related U.S. Application Data

[63] Continuation-in-part of Ser. No. 673,225, Mar. 21, 1991, which is a continuation-in-part of Ser. No. 516,201, Apr. 30, 1990, abandoned.

[51] Int. Cl.$^5$ ............................................ A01D 34/13
[52] U.S. Cl. ........................................ 56/300; 30/309; 30/337; 56/303
[58] Field of Search ............... 56/396, 298, 299, 300, 56/301, 303; 30/309, 335, 336, 337

[56] References Cited
U.S. PATENT DOCUMENTS

| 635,321 | 10/1899 | Hill | 56/300 |
|---|---|---|---|
| 1,158,521 | 11/1915 | McElroy | 56/300 |
| 1,214,345 | 1/1917 | Melby | 56/300 |
| 2,427,306 | 9/1947 | Schafer | 56/300 |
| 3,013,373 | 12/1961 | Kopaska | 56/298 |
| 4,198,803 | 4/1980 | Quick et al. | 56/296 |
| 4,223,514 | 9/1980 | Halls et al. | 56/299 |
| 4,646,440 | 3/1987 | Decker | 56/335 X |

Primary Examiner—George A. Suchfield
Attorney, Agent, or Firm—Hayes, Soloway, Hennessey & Hage

[57] ABSTRACT

A two-piece cutter member for mounting on a sickle bar has a rigid thin support element arranged for relatively permanent attachment to a sickle bar, and a flat planar pyramid-shaped spring metal blade. A portion of the blade provides at least one bridge or loop for encircling the support element and holding the blade on the support element. A section of either said the portion or the support element is displaced with respect to the support face to releasably hold the blade on the support when the blade is fully positioned on said support element. The spring metal blade is preferably formed of two thin sheet welded together near their edges.

4 Claims, 5 Drawing Sheets

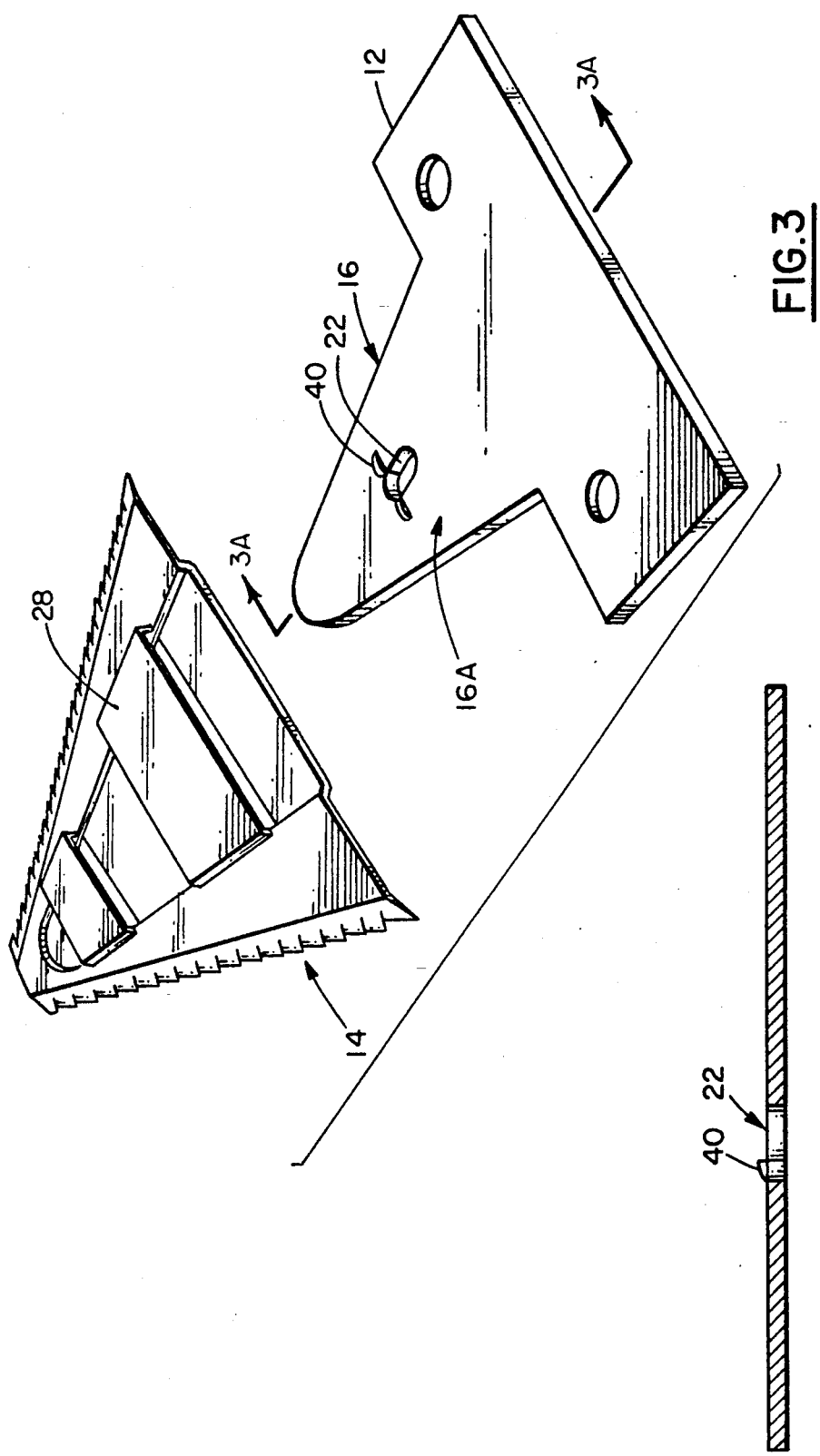

MOWING DEVICE

The present invention relates to improvements in mowing devices. This application is, in part, a continuation of my copending application Ser. No. 07/673,225 filed Mar. 21, 1991 which in turn was a continuation in part of my copending application Ser. No. 07/516,201 filed Apr. 30, 1990, now abandoned. The invention has particular utility in connection with sickle bar cutter member for mowing machines, and more particularly to replacement cutter members for such sickle bars, and will be described in connection with such utility, although other utilities, e.g. in connection with swathers, combines and other harvesting equipments are contemplated.

BACKGROUND OF THE INVENTION

Field of the Invention

Replaceable cutter members have long been a standard feature of sickle bars since the cutter members are subject to damage and breakage due to use. The art is well-developed in this area and is represented by the following U.S. patents:

U.S. Pat. No. 97,062 issued Nov. 23, 1869 in the name of G. L. Du Laney; and

U.S. Pat. No. 594,747 issued Nov. 30, 1897 in the name of H. M. Landes;

U.S. Pat. No. 635,321 issued Oct. 24, 1899 in the name of J. B. Hill;

U.S. Pat. No. 915,247 issued Mar. 16, 1909 in the name of P. E. Sundquist;

U.S. Pat. No. 997,495 issued Jul. 11, 1911 in the name of W. R. Gourley;

U.S. Pat. No. 1,137,662 issued Apr. 27, 1915 in the name of B. C. Parsons;

U.S. Pat. No. 1,158,521 issued Nov. 2, 1915 in the name of J. H. McElroy;

U.S. Pat. No. 1,164,691 issued Dec. 21, 1915 in the name of T. J. Wilson;

U.S. Pat. No. 1,214,345 issued Jan. 30, 1917 in the name of B. Melby;

U.S. Pat. No. 1,274,659 issued Aug. 6, 1918 in the name of J. W. Alexander;

U.S. Pat. No. 1,315,312 issued Sep. 9, 1919 in the name of J. H. Klenck;

U.S. Pat. No. 1,537,354 issued May 12, 1925 in the name of C. F. Hover;

U.S. Pat. No. 1,684,616 issued Sep. 18, 1928 in the name of F. J. Bicek;

U.S. Pat. No. 3,013,373 issue Aug. 15, 1958 in the name of A. F. Kopaska;

U.S. Pat. No. 2,427,306 issued Sep. 9, 1947 in the name of J. F. Schafer;

U.S. Pat. No. 4,223,514 issued Sep. 23, 1980 in the name of Lawrence M. Halls and Horace G. McCarty;

U.S. Pat. No. 4,646,440 issued Mar. 3, 1987 in the name of John R. Decker;

In addition there are the following foreign patents of interest:

British Patent Number 2967 issued Sep. 10, 1873
British Patent Number 891085 issued Jun. 22, 1959
German Patent Number 832357 issued Feb. 25, 1952

In all of these patents the whole blade must be replaced when there is any damage to the blade. This replacement involves various degrees of difficulty and expense.

BRIEF DESCRIPTION OF THE INVENTION

In the present invention there is provided a novel two-piece cutter member which can be semi-permanently mounted onto a sickle bar. The cutter member comprises a relatively rigid or semi-rigid support element having a base portion for rigid attachment to the sickle bar. The support element preferably extends from the sickle bar in the form of a pyramidal shape roughly representing the shape of a tooth of the cutter element. Carried by the rigid support element, there is a flat spring metal blade which is readily removable from the support element. The spring metal blade includes a cutting face and a support face. The spring metal blade preferably has at least one portion displaced from the plane thereof to provide at least one bridge or loop for surrounding the support element. This loop preferably includes a detent which is bent toward the plane of the blade and is positioned to engage an opening in the support element to releasably lock the spring metal cutter element onto the support element. Preferably, other portions of the spring metal blade are also displaced from the plane thereof to stiffen the blade and engage the edges of the support element to provide transmittal of cutting forces from the flat spring metal blade to the support element.

DETAILED DESCRIPTION OF THE INVENTION

In order to more fully understand the invention, reference should be had to the following detailed description taken in connection with the following drawings wherein:

FIG. 3 is an exploded schematic view of another preferred embodiment of the invention.

FIG. 3a is an enlarged section view of a portion of FIG. 3 along the line A—A.

FIG. 4b is a cross-sectional view of the blade section illustrated in 4a.

FIG. 5a is a plan view of a second part of the blade modification of 4a.

FIG. 5b is a sectional view of the blade portion of FIG. 5a.

Figure 1:
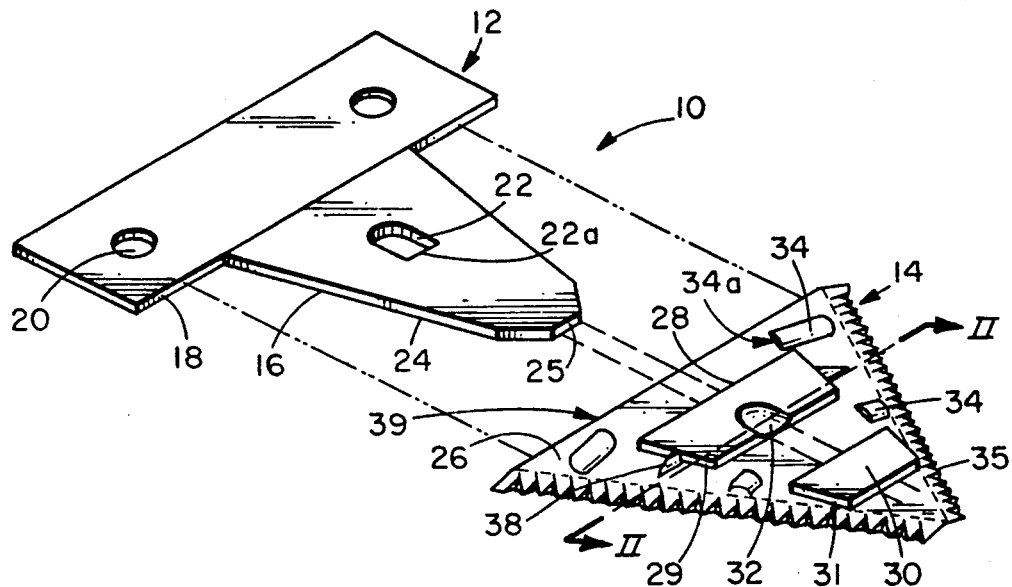
FIG. 1 is an exploded schematic view of the two-piece cutter member.
Figure 2:
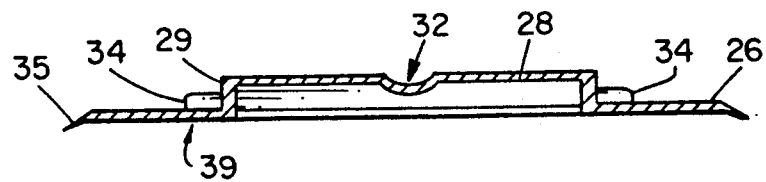
FIG. 2 is a partial schematic cross-sectional view of the blade taken along the line II—II of FIG. 1.

Referring now to FIGS. 1 and 2, the two-piece cutter member, generally indicated at 10, comprises the relatively rigid support element 12 and the flat spring metal blade 14 carried thereby. The support element, which preferably is formed of a spring steel, comprises a rigid support member 16 which preferably is of a roughly pyramidal shape which extends from the front edge of base member 18. The support element 12 is adapted to be secured, more or less permanently, to the sickle bar by fastening means such as bolt holes 20. An opening 22 is provided in the rigid support member portion 16. Sloping walls faces 24 terminate at an end 25 of the rigid support member.

The flat spring metal blade, generally indicated at 14, comprises a thin sheet, e.g. 0.005–0.030 inch thick spring steel shown at 26 as having offset portions 28 and 30 forming a loop therefrom. These portions are offset by at least the thickness of the rigid support member 16 to permit these offset portions to be slipped over the end 25 of the rigid support member 16.

The flat spring metal blade includes a cutting face 35, a support face 39 to receive the rigid support member, and a planar face 26. Formed on the planar face are offset portions 28 and 30 and reinforcing ribs 34 and 38.

Detent 32 formed in the lower loop 28, essentially extends across the loop opening. Reinforcing ribs 34 and 38 may be provided along the edges of the planar part of the blade inside of the area including the teeth 35. The vertical walls 29 and 31, respectively of loops 28 and 31, run parallel to edge 24 of the rigid support member 16. The same is true of the interior edges 34a of the ribs 34.

In view of the above construction, when the spring metal blade 14 is slipped over rigid support member 16, it will slide down until detent 32 enters the hole 22. At this point, all of the vertical walls 29, 31 and 34A engage the edge 24 of the rigid support member 16 and the rear edge of detent 32 will engage the transverse wall 22A of the hole 22 and lock the spring metal blade in position. The reinforcing ribs 38 adjacent to each of the walls 29 and 31 add additional rigidity to the structure. When the blade is thus rigidly mounted onto the rigid support member 16 the cutting forces are transmitted through the relatively thin, but reinforced, spring metal sheet from the cutting edge 35 to the rigid support element 12. When the spring metal blade 14 is damaged or dulled it can be easily removed by pushing on the detent 32 to release it from the edge 22A permitting easy removal of the whole spring metal blade 14 therefrom for repair or replacement. Thus a very lightweight blade is provided which is of much less cost than a blade formed of a single rigid piece having sufficient mass to absorb the cutting forces.

In a preferred form of the invention, the support element is made of heat treated and tempered spring steel 0.060 inch thick and the steel blade is made of heat treated and tempered spring steel 0.015 inch thick. As will be noticed, the cutting edge 35 is bent downwardly away from the cutting face so that the cutting edge can be held in tight spring-like engagement with the stationary bar of the cutter, thus providing efficient cutting action.

In another preferred embodiment of the invention, the means for holding the replaceable blade on the rigid support comprises a ridge 40 on the support element as illustrated in FIGS. 3 and 3a. This ridge 40 is formed by upsetting a portion of the upper surface 16a on the support 16 adjacent hole 22. In this embodiment of the invention, the loop 28 is not deformed at 32 as in FIG. 1. When the loop 28 passes over the ridge 40 it bends outwardly and then snaps in position behind the ridge 40 to hold the blade 14 firmly on the support.

Since the ridge 40 is along side the hole 22 (see FIG. 3a), a tool may be inserted into hole 22 and under the edge of loop 28 to lift this edge over the ridge 40 when the blade 14 is to be removed for sharpening or replacement. If desired, hole 22 may be replaced by a groove.

Still another preferred embodiment of the invention the replaceable blade is formed of two matching sheet metal pieces which are welded together near their edges to form a single piece which surrounds the rigid support and is held on the rigid support in the same manner as shown in either FIG. 1 or FIG. 3.

Figure 4A:
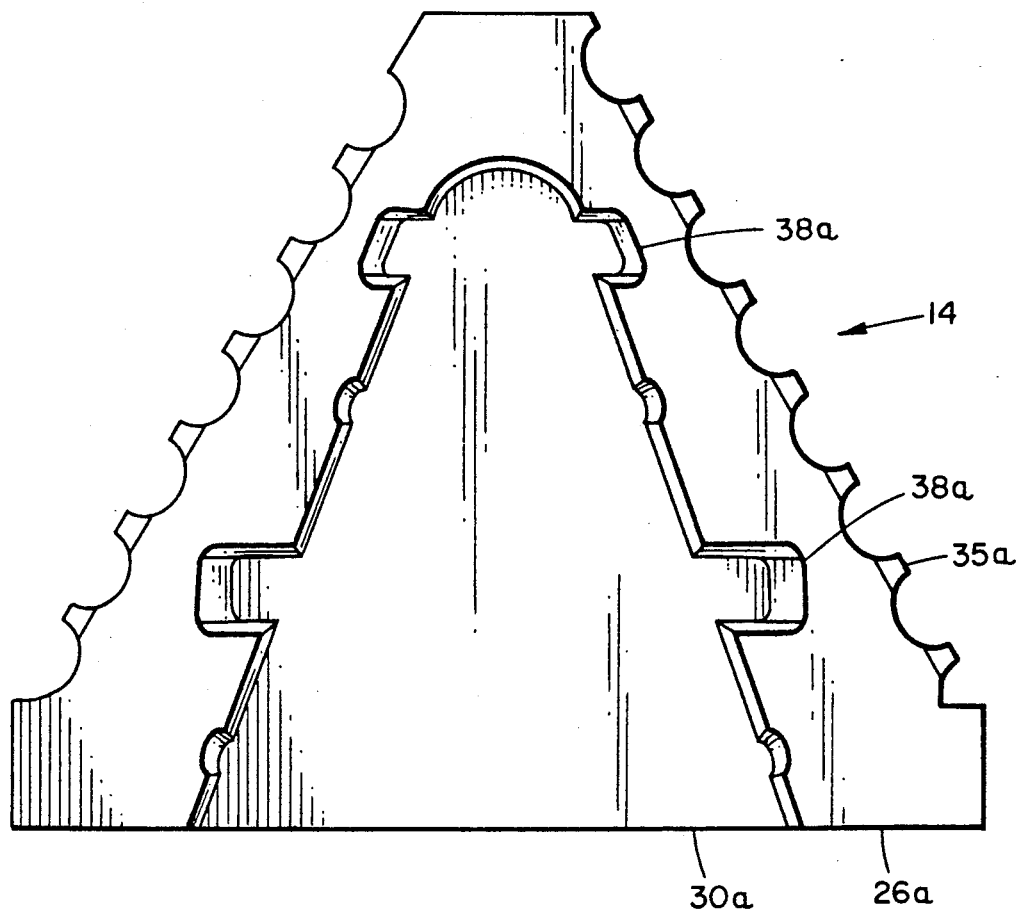
FIG. 4a is an enlarged plan view of another preferred embodiment of the invention.
Figure 4B:
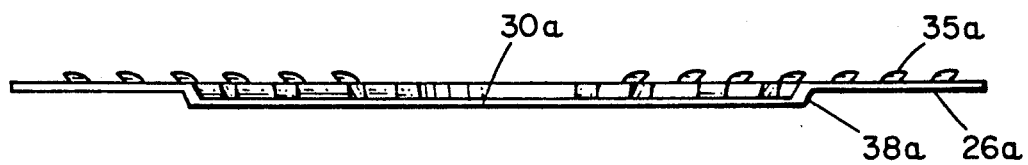

Referring more detail to FIGS. 4a and 4b a bottom piece is illustrated as a flat metal sheet element 26a bent so that a portion 30a is displaced from the plane of the sheet 26a. Reinforcing ribs 38a serve the same function as the ribs 38 in the other figures and serve to stiffen the blade to transmit the cutting force from cutting teeth 35a to the rigid support element. As will be seen the displaced portion 30a, in FIG. 4a does not have any cutout sections and it fits snuggly against the backside of the rigid support element.

Figure 5A:
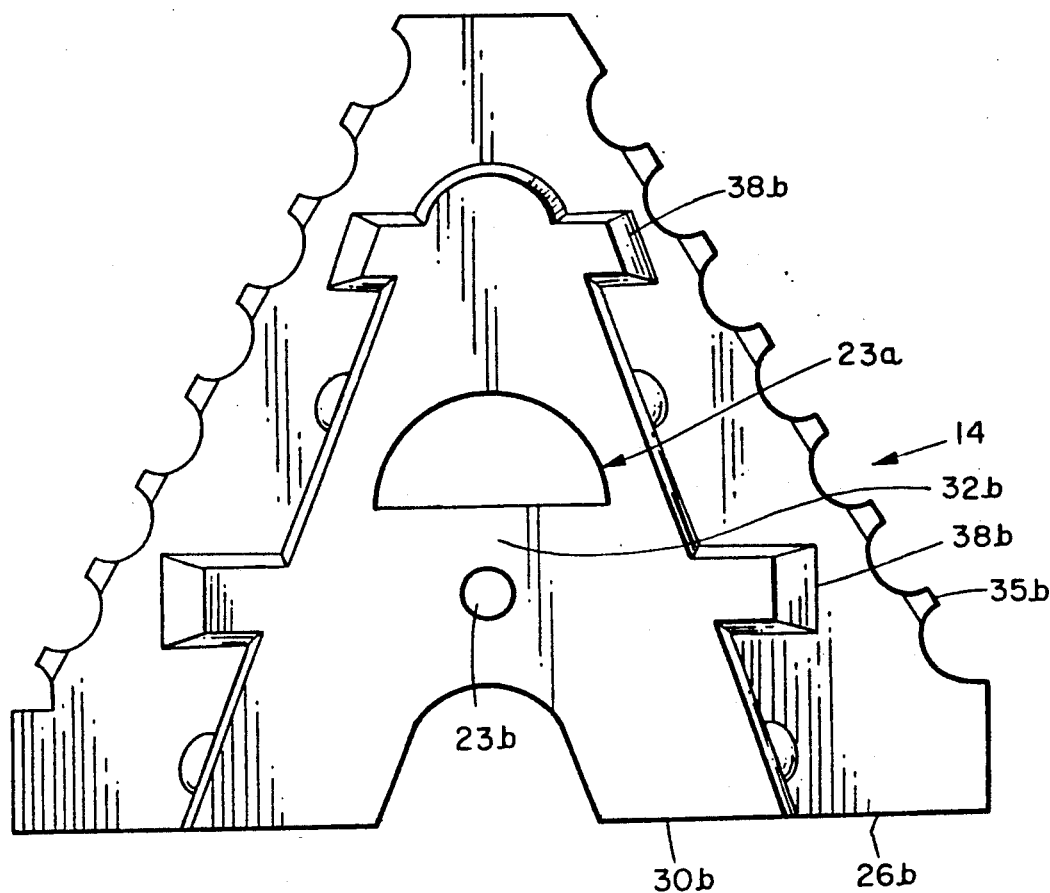
Figure 5B:
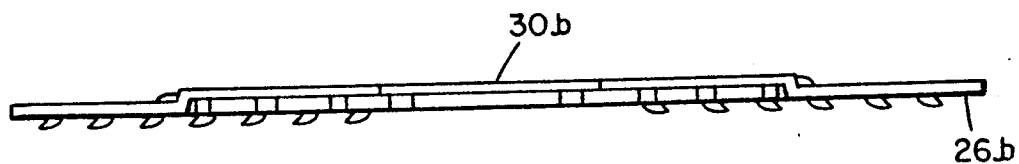

The top piece is shown in FIGS. 5a and 5b as a flat section 26b and a displaced section 30b. The section 30b has at least two cutout sections, 23a and 23b. These correspond to the openings 22 in the other Figures. Teeth 35b are slightly displaced with respect to the teeth 35a. Similar reinforcing ribs 38b to the ribs 38a of FIG. 4a and 4b are also provided.

Figure 6:
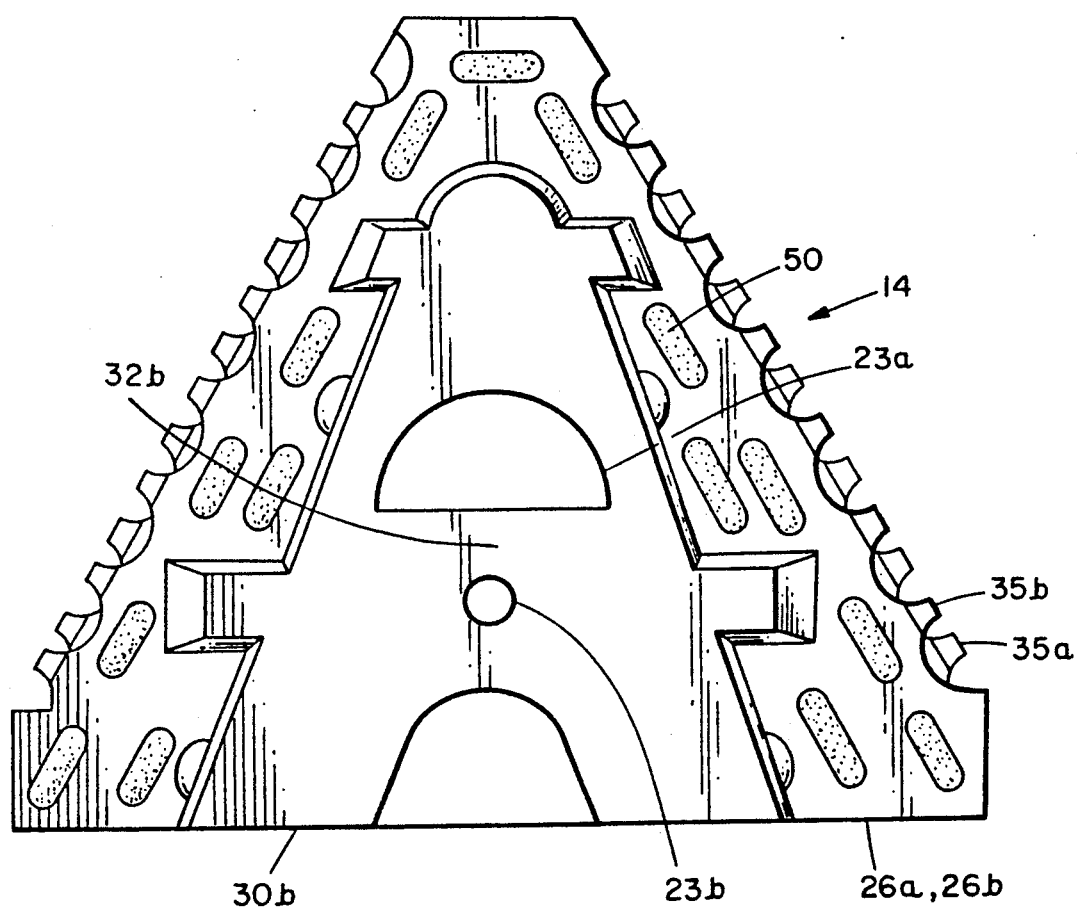
FIG. 6 shows the two blades welded together to form a single blade element.

In manufacturing the final blade, the top and bottom pieces are superimposed as shown in FIG. 6 and are secured together by plurality of spotwelds 50 which make a single rigid piece, constituting a cutter blade which can be slid over the end of a rigid support piece 16 and be held in place by displacement of the portion of the top loop 30b. This provides a very strong rugged device which can be made from thin spring steel stock. It can be easily replaced and would be securely held by, for example, the raised portions 40 (see FIG. 3) on the rigid support element 60. It can be released by putting a tool through the hole 23b and lifting up the portion of the loop 32b between the hole 23b and the hole 23a thus clearing the ridges 40. Alternatively, a portion of the edge of hole 23a can be bent toward the offset portion 30 as shown at 32 in FIGS. 1 and 2.

Various changes may be made in the invention without departing from the spirit and scope thereof. For example, cutting edge 35 may be serrated as shown in the drawings, or the cutting edge may take on a variety of geometries depending on the intended use. Still other changes may be made by one skilled in the art from the foregoing specification.

We claim:

1. A triangular shaped blade element for mounting on a relatively rigid flat triangular support element attached to a sickle bar, said blade element being formed of two spring metal triangular sheets welded together near their edges, at least one of the sheets having its edges serrated to provide a cutting edge, at least one of said sheets constituting a loop portion for encircling said support element, said loop portion being flexible so as to move away from contact with said support element as it is slid on said support element and reaches a point where a section of either said loop portion or said support element is displaced with respect to the area of contact between the loop portion and the support element, said flexible loop portion returning to its original shape when the blade is fully seated and the displaced portion acts to releasably hold the blade on the support element.

2. The blade element of claim 1 wherein said loop portion is bent towards the plane of the blade and is positioned to engage a hole in the support element.

3. The blade element of claim 1 wherein the loop portion is sufficiently flexible to pass over a ridge having a rear shoulder for engaging a front edge of the loop portion.

4. A two-piece cutting device for mounting on a sickle bar, comprising a rigid, thin support element arranged for relatively permanent attachment to the sickle bar; and a blade releasably mounted on the support element said blade element being formed of two spring metal triangular sheets welded together near their edges, at least one of the sheets having its edges serrated to provide a cutting edge, at least one of said sheets constituting a loop portion for encircling said support element, said loop portion being flexible so as to move away from contact with said support element as it is slid on said support element and reaches a point where a section of either said loop portion or said support element is displaced with respect to the area of contact between the loop portion and the support element, said flexible loop portion returning to its original shape when the blade is fully seated and the displaced portion acts to releasably hold the blade on the support element.

* * * * *